March 7, 1961 B. A. McLEOD 2,974,198

RANDOM SIGNAL GENERATOR

Filed Feb. 10, 1958 2 Sheets-Sheet 1

INVENTOR
B. A. McLEOD
BY Harry C. Hart
ATTORNEY

INVENTOR
B. A. McLEOD
BY Harry C. Hart
ATTORNEY

United States Patent Office 2,974,198
Patented Mar. 7, 1961

2,974,198

RANDOM SIGNAL GENERATOR

Bruce A. McLeod, New Providence, N.J., assignor to Bell Telephone Laboratories, Incorporated, New York, N.Y., a corporation of New York Filed Feb. 10, 1958, Ser. No. 714,392

12 Claims. (Cl. 179—1)

Figure 1:
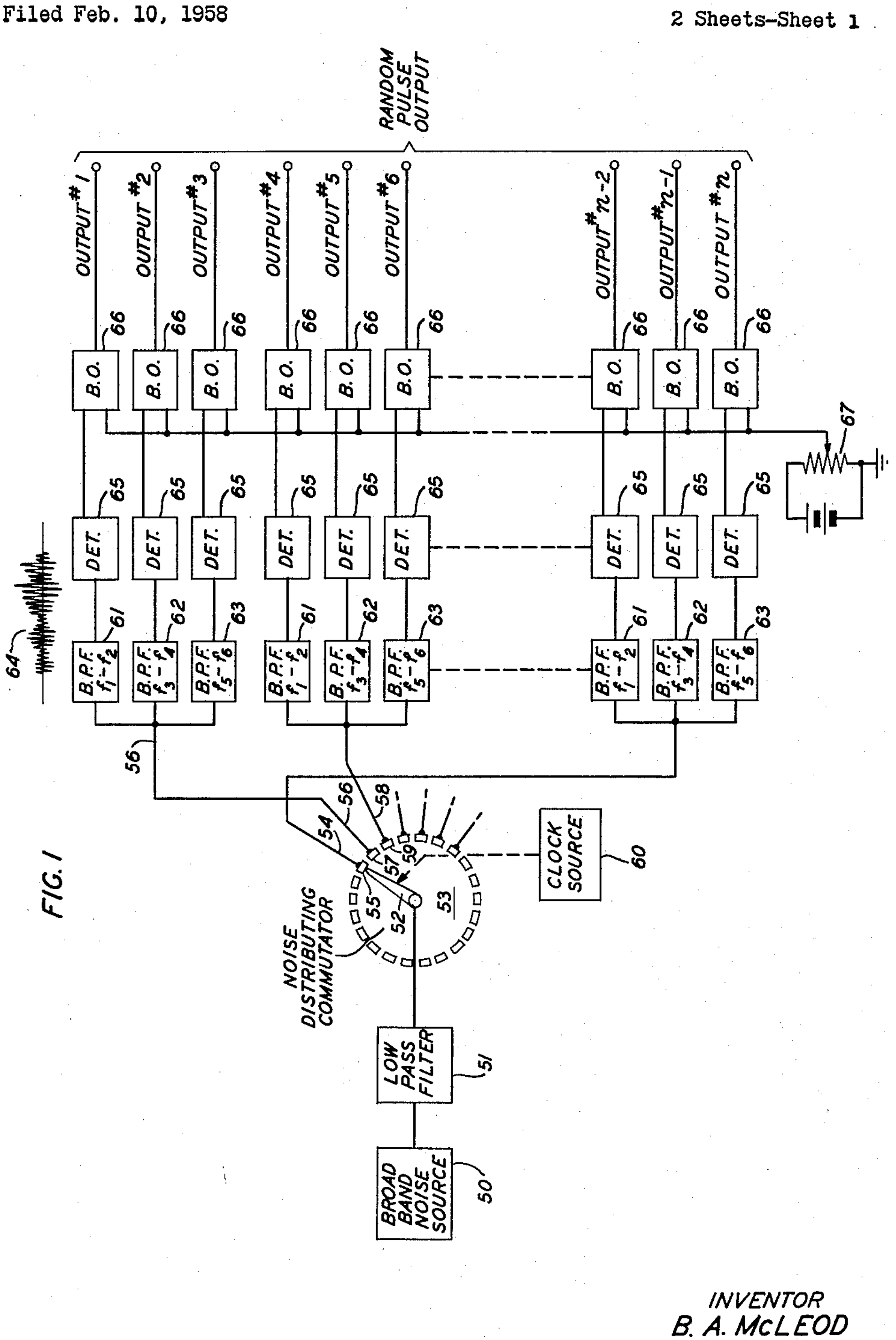

This invention relates to random signal generators and, more particularly, to circuits for generating large numbers of independent signals of random occurrence and length for use in testing transmission systems.

In order to test certain tnansmission systems, it is desirable to generate signals which simulate the activity of average human speakers, i.e., to simulate talkspurts. In such a testing arrangement a large number of talkers must be independently simulated both as to their average occurrence of speech and as to their mean talkspurt length. Occurrence may here be defined as the average number of times a talker becomes active, i.e., begins speaking, in a given time interval. Mean talkspurt length is, of course, the length of time for which an average talker sustains his talkspurt. Activity then is the proportion of the time which a talker is actually emitting speech and is therefore a function of both occurrence and mean talkspurt length. A transmission system particularly requiring this type of testing equipment is a Time Assignment Speech Interpolation (TASI) system.

A TASI system attempts to economize on expensive transmission facilities by making full use of all of the available channel time. Such a system is based on the statistical fact that any single telephone conversation uses the facilities on the average, for less than one-third of the time. Therefore, by interconnecting the two parties only when the line is active, large savings in channel time may be effected.

While the activity characteristics of a large number of talkers behaves in a predictable manner, it should be remembered that each individual talker begins and ends his talkspurts in a completely random manner. Taking a large number of individual talkers and treating them together, however, as is done in a TASI system, permits reliance on statistical, and hence predictable, activity characteristics rather than the random activity of individual talkers.

One of the problems encountered in the design of a TASI system is that of "freeze-outs." No matter what statistical speech distribution is assumed, statistically there will remain a small percentage of the time when more talkers are active than there are transmission channels available. In this case, one or more of the talkers will be denied access to the transmission system, i.e., will experience a "freeze-out." In effect, a portion of his speech will be lost to the intended listener. Heretofore, only estimates of the subjective effect of such "freeze-outs" on the listener could be obtained without actually employing human speakers for the tests. In large systems, the use of human speakers for testing purposes is impractical and, furthermore, the statistics involved cannot be adjusted or controlled.

It is therefore an object of the present invention to generate a large number of independent signals which are completely random.

It is another object of the invention to independently control both the average occurrence rate and the mean lenth of a large number of random signals.

It is a more specific object of the invention to test the capabilities and the limitations of a time assignment speech interpolation system without the use of human speakers.

It is yet another object of the invention to simulate human speech of a large number of talkers, both as to their activity and mean talkspurt length.

In accordance with the present invention, a broadband noise source is band-limited to a frequency of $f$ and is sampled at a rate $2f$. The individual samples are distributed in sequence to a large number of control leads each of which includes a band-limiting filter, a detector and a pulse generator with an adjustable threshold of response. The band-limiting filter removes the sampling frequencies from the series of noise samples delivered to it while the detector derives a signal representing the instantaneous amplitude of the envelope of those band-limited noise samples. Since this amplitude varies in an entirely random fashion, it can be used to trigger a threshold pulse generator and produce pulses which are of fixed length but random occurrence. There are thus provided means for generating random pulses on a large number of separate leads. These pulses are not only random on each output lead but the outputs on all of the leads are completely independent and uncorrelated.

A major advantage of this random pulse generator is that the average repetition rate of the pulses on each of the output leads can be varied merely by varying the response threshold of its pulse generator. Furthermore, the average repetition rate of all of the outputs can be maintained at the same level and can be varied simultaneously by utilizing a common threshold control.

In accordance with another aspect of the invention, two of such random pulse generators can be used, one to set an array of bistable devices and the other to reset the bistable devices. If the outputs of the bistable devices are used to operate gates which connect a simulated speech signal to the input terminals of a TASI system, there are thus provided a large number of simulated talker lines. The average rate of occurrence of these simulated talkspurts can be controlled by adjusting the bias on the threshold pulse generators of one of the random pulse generators. The mean length of these talkspurts can be independently controlled by adjusting the bias on the threshold pulse generators of the other of the random pulse generators. Complete control over simulated talker activity is thus maintained.

It can be seen that the above-described arrangements provide a signal source which simulates a large number of human talkers, both as to their occurrence and as to their mean talkspurt length. Furthermore, these statistical characteristics of the simulated speech can be independently varied to determine the effect of such variations in a system serving actual human talkers.

These and other objects and features, the nature of the present invention and its various advantages, will appear more fully upon consideration of the attached drawings and the following detailed description of these drawings.

Figure 2:
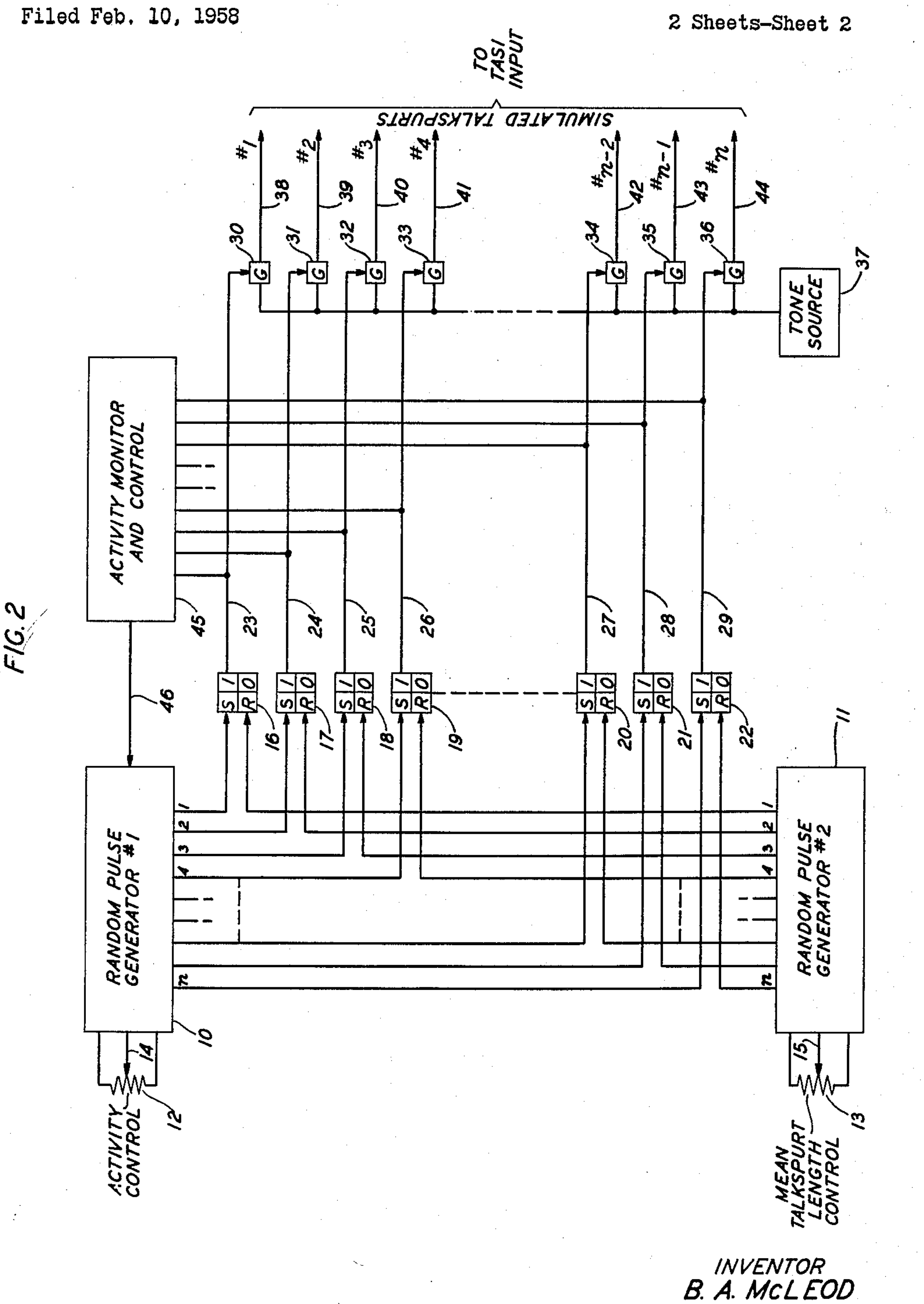

In the drawings:

Fig. 1 is a schematic block diagram of a multiple random pulse generator in accordance with the present invention; and Fig. 2 is a schematic block diagram of a talkspurt simulator in accordance with the invention and utilizing two of the pulse generators shown in Fig. 1.

In Fig. 1 there is shown an illustration of a multiple random pulse generator in accordance with the present invention. This multiple random pulse generator comprises a broadband noise source 50, the output of which is passed through a low pass filter 51. Noise source 50 may be any one of the conventional noise sources such as, for example, a thermionic diode, which produces an output noise signal with a relatively broad frequency spectrum. Low pass filter 51 limits the frequency spectrum of this noise signal and preferably has an attenuation characteristic such that the noise output from this filter is evenly distributed throughout the frequency spectrum of its passband.

The output of the low pass filter is connected to the brush 52 of a distributing commutator 53. Commutator 53 has $n/3$ output segments, where $n$ is the total number of independent output signals desired. Each of these segments has connected thereto an output conductor. Thus, output conductor 54 is connected to commutator segment 55, output conductor 56 is connected to commutator segment 57 and output conductor 58 is connected to commutator segment 59. Commutator 53 is driven by a clock source 60 at a frequency equal to twice the cut-off frequency of low pass filter 51. There are thus delivered in sequence to the output conductors pulses which retain the random characteristic of the noise of the source 50 as disparities between the amplitudes of the individual noise pulses. Commutator 53, shown as a mechanical commutator, is, of course, in an actual embodiment an electronic commutator such as any one of those known in the art having a switching speed of twice the cut-off frequency of filter 51.

To each of the output conductors 54, 56, 58, etc., there are connected three bandpass filters 61, 62, and 63 such as those shown connected to output conductor 56. Each of the bandpass filters 61, 62 and 63 is sharply tuned to pass a narrow band of frequencies grouped about their respective center frequencies. Filters 61, 62 and 63 have equal bandwidths but these bandwidths are grouped about center frequencies which differ from each other by more than the bandwidth of the individual filters. Thus, filter 61 passes a band of frequencies between frequency $f_1$ and $f_2$; filter 62 passes a band of frequencies between frequency $f_3$ and frequency $f_4$; and filter 63 passes a band of frequencies between frequency $f_5$ and frequency $f_6$. The reason for this arrangement will be described hereinafter. The highest upper cut-off frequency of filters 61, 62 and 63 is chosen to be lower than half the repetition rate of the input signal.

The output of each of the bandpass filters 61, 62 and 63 has the form shown by waveform 64. Due to the fact that the highest frequency passed by these filters is less than half the sampling rate, the sampling frequency is removed from the noise signal by the filters. Waveform 64 is essentially a sine wave of a frequency roughly equal to the mid-band frequency of the particular filter and having an amplitude which fluctuates in a random fashion in dependence on the energy of the impulse delivered to the filter, i.e., the amplitude of the noise sample picked out by the commutator 53 for delivery to that filter. The frequency of these random fluctuations is on the order of the bandwidth of the filter. The characteristics and properties of this wave have been studied and described in detail by S. O. Rice in an article entitled "Mathematical Analysis of Random Noise" appearing on pages 46 through 156 of the Bell System Technical Journal, volume 24, January 1945 and, more particularly, in sections 3.7 and 3.8 at pages 75 through 87 of that article. It is sufficient for the purposes of the present invention to note, first, that the average number of maxima occurring per second in the envelope of such a wave is directly proportional to the bandwidth of the filter, and second, that these maxima occur completely at random with respect to time and are characterized by a distribution function determined by the characteristics of the filter. Simple envelope detecting circuits 65 are used to detect the envelopes of these several waves and thus produce signals the amplitudes of which are random with respect to time.

A plurality of pulse generating circuits 66 are each provided with an amplitude threshold device which responds only to an input signal exceeding a predetermined amplitude. Pulse generating circuits 66 may, for example, comprise blocking oscillator circuits such as those shown in J. H. Felker Patent 2,745,012, issued May 8, 1956, the input of each of which is biased by a voltage equal to the predetermined threshold of response. A common control element 67 may then be used to vary the thresholds of all of the pulse generating circuits 66 together. There is thus provided at the output of each pulse generating circuit 66 a train of pulses which occur randomly with respect to time and the average repetition rate of which can be varied simply by varying the common control element 67. On the $n$ output leads there are provided random pulses which are suitable for operating the talkspurt simulator to be described with reference to Fig. 2.

In Fig. 2 there is shown a block diagram of a talkspurt simulator in accordance with the invention comprising first and second random pulse generators 10 and 11, which may be of the form shown in Fig. 1. Random pulse generators 10 and 11 are similar in that each of them is provided with $n$ output leads arranged in succession beginning with number 1 and proceeding to number $n$. Furthermore, each random pulse generator is provided with a common resistive control unit, i.e., random pulse generator 10 is provided with a common control element 12 while random pulse generator 11 is provided with a common control element 13. The function of each of these pulse generators, as described with reference to Fig. 1, is to provide a series of pulses on each of these $n$ output leads which are of uniform duration but of random spacing. That is, each pulse on each output lead occurs randomly with respect to the pulses on all of the other output leads as well as the other pulses on the same output lead.

A variable tap 14 on common control element 12 varies the average repetition rate of the pulses on all of the output leads of random pulse generator 10. This common control element has been called the activity control. Similarly, a variable tap 15 on common control element 13 varies the average repetition rate of the pulses on all of the output leads of random pulse generator 11. This common control element has been called the mean talkspurt length control. The function of these two control elements 12 and 13 will be described hereinafter.

Each of the output leads from random pulse generator 10 is connected to the "set" input of one of $n$ bistable devices. Thus output lead number 1 is connected to the "set" input of bistable device 16, output lead number 2 is connected to the "set" input of bistable device 17, and so forth to output lead number $n$ which is connected to the "set" input of bistable device 22. Similarly, each of the output leads from random pulse generator 11 is connected to the "reset" input R of one of the $n$ bistable devices 16 through 22. Thus output lead number 1 from random pulse generator 11 is connected to the "reset" input of bistable device 16, output lead number 2 is connected to the "reset" input of bistable device 17, and so forth to output lead number $n$ which is connected to the "reset" input of bistable device 22.

Bistable devices 16 through 22 are devices of any well-known form, such as bistable multivibrator circuits, which are capable of remaining in either one of two states or conditions. A pulse input on one lead serves to "set" one of the bistable devices in one of these states while a pulse input on another lead serves to "reset" it in the other of the two states. Thus, the randomly spaced pulses from generator 10 set bistable devices 16 through 22 in one state while pulses from generator 11 reset these devices to the other state.

The state of each of these bistable devices is sensed by the signal conditions on $n$ output control leads 23 through 29, identified by the "1" in the bistable devices 16 through 22 in Fig. 2. These signal conditions may, for example, comprise a fixed positive voltage when the bistable device is in a "set" condition and zero voltage when the bistable device is in a "reset" condition. There are thus provided in each of $n$ control leads 23 through 29 a series of pulses which are random both in occurrence and in length. The average rate of occurrence of these output pulses can be controlled by means of control element 12, which fixes the average repetition rate of the pulse outputs from random pulse generator 10 and, in turn, controls the rate at which bistable devices 16 through 22 are switched to the "set" condition. For any chosen mean talkspurt length, this control will set the activity of the simulated talkers and has therefore been termed the "activity control." The average length of the output pulses on control leads 23 through 29 can likewise be controlled by means of control element 13, which fixes the average repetition rate of the pulse outputs from random pulse generator 11 and, in turn, controls the rate at which bistable devices 16 through 22 return to the reset condition.

Each of control leads 23 through 29 is connected to one of a series of gates 30 through 36. Each of the gates 30 through 36 is of the "transmit through" type. That is, an enabling signal on an enabling input lead connects a signal input lead to a signal output lead. All of the signal input leads to gates 30 through 36 are connected to a common tone source 37. An enabling signal, for example, a positive voltage, on each of the control leads 23 through 29 connects the signal from this common tone source 37 to one of the $n$ output leads 38 through 44. Thus a signal on control lead 23 connects tone source 37 through gate 30 to output lead 38, identified as #1, a signal on control lead 24 connects tone source 37 through gate 31 to output lead 39, identified as #2, and so fourth to control lead 29 which connects tone source 37 through gate 36 to output lead 44, identified as #$n$. Each of the gates 30 through 36 may comprise any simple diode, transistor or vacuum tube transfer switch such as, for example, the diode switch disclosed in W. D. Lewis Patent 2,535,303 issued December 26, 1950, or other equivalent circuit.

The output leads 38 through 44, numbered from #1 to #$n$, comprise the $n$ output leads carrying simulated talkspurts and are indicated as comprising the input to a time assignment speech interpolation (TASI) system. A TASI system for which this talkspurt generator would be suitable is disclosed in the copending application of F. A. Saal and I. Welber, Serial No. 686,468, filed September 26, 1957 and assigned to applicant's assignee since matured into U.S. Patent 2,935,569, issued May 3, 1960. Other TASI systems or other types of voice transmission systems would, of course, be equally suitable.

In the talkspurt simulator of Fig. 2, common control element 12 has been designated the activity control because this control, once the mean talkspurt length has been set, will vary the activity of the simulated speech output. Similarly, common control element 13 has been designated the mean talkspurt length control because this control will vary the mean length of the simulated speech output.

Tone source 37 may comprise merely a simple single-frequency audio oscillator to adequately simulate talkspurts for many purposes. If the tests being conducted are affected by frequency-dependent variables of the transmission system, however, the single-frequency audio oscillator may be replaced by a complex wave generator which more accurately represents the frequency characteristics of human speech. Tone source 37 may, in fact, comprise an actual recording of human speech. Such a recording would, of course, have to be constructed by eliminating the actual interruptions in the human speech to allow the circuit of Fig. 2 to insert statistically controlled interruptions. Furthermore, each of the output leads 38 through 44 may be supplied with a separate signal source to even more accurately simulate a large number of human speakers. In most cases, however, a simple signal source common to all of the output leads will be sufficient.

In the circuit of Fig. 2, each of the control leads 23 through 29 is shown connected to an activity monitor 45. Activity monitor 45 may be provided to monitor the activity of the simulated talkers and to generate a control signal on lead 46. Thus if the setting of activity control 12 is not exactly proper for the desired simulated activity, or if this setting tends to drift with time, an error correction signal on control lead 46 may be used to correct the average repetition rate of the pulse outputs from random pulse generator 10. Activity monitor 45 may, for example, comprise a simple counting circuit which counts the number of input leads having a signal thereon in a given time interval. If this count exceeds a predetermined number, a control signal of a first kind will be provided on control lead 46 to reduce the average repetition rate of the pulse outputs from random pulse generator 10 and thus reduce the activity of the simulated talkers. If this count is less than the predetermined number, a control signal of a second kind will be provided on control lead 46 to increase the average repetition rate of the pulse outputs from random pulse generator 10 and thus increase the activity of the simulated talkers. If this count exactly equals the predetermined number, no control signal will be provided on control lead 46. Many types of automatic control circuits would be suitable for performing this function and, since they form no part of the present invention, will not be further described here.

There has been described with reference to Fig. 2 a random signal generator suitable for generating a large number of output signals each of which simulates the activity pattern of a human speaker. It has been statistically determined that to simulate the activity of a large number of actual speakers, an average repetition rate for the pulses on each of the output leads of random pulse generator 10 of between 0.2 and 2.0 pulses per second is required. Similarly, to simulate the mean talkspurt length of a large number of speakers, an average repetition rate for the pulses on each of the output leads of random pulse generator 11 of between 0.5 and 5.0 pulses per second is required. Therefore, if pulse generators 10 and 11 are constructed to generate pulses the repetition rates of which can be varied throughout these respective ranges, all of the possible activity patterns of actual human speakers can be simulated merely by making the proper dial settings on control elements 12 and 13. The subjective effect of these various activity patterns in a time assignment speech interpolation system can then be tested by connecting all of the inputs but one of a TASI system to the talkspurt simulator of Fig. 2. The remaining input can be used as a test channel to test the receiving-end effect of various activity patterns. In this way, simple, reliable, controllable and accurate tests of these effects can be made without the use of human speakers.

A specific illustration will serve to further explain the operation of the multiple random pulse generator shown in Fig. 1 with reference to the talkspurt simulator of Fig. 2. Since we know that the mean talkspurt length of a large number of talkers varies between 0.2 and 2 seconds, it can be easily calculated that random pulse generator 11 in Fig. 2 must produce output pulses having an average repetition rate which can be varied between 0.5 and 5 pulses per second. From the article by S. O. Rice it is known that the average number of maxima occurring per second in the envelope of the filter output is given by $$M = .6411\ (f_2 - f_1) \qquad (1)$$

where $f_2$ and $f_1$ are the upper and lower cutoff frequencies, respectively, of the filter.

If the trigger levels of the pulse generators 66 in Fig. 1 are set to select only those maxima of a particular level and above, the average repetition rate of the output pulses is given by $$f_a = PM$$
$$= .6411P\ (f_2 - f_1) \qquad (2)$$

where P is the percentage of the maxima which will trigger the pulse generators 66. P is an easily determined quantity which is fixed by the calculated distribution of the maxima as shown by Rice. The threshold of the pulse generators 66 is then merely set to produce this particular P.

If we wish to produce $n$ independent random pulse sources, we must supply each of the band-pass filters 61, 62 and 63 with noise samples at a rate of at least twice its upper cut-off frequency. This immediately follows from the fact that a filter can reconstruct a signal and all of its characteristics (in this case, random amplitude) only if at least two samples of the signal are delivered to the filter in the period of the highest frequency component to be reconstructed. If we let this highest frequency component equal $f_6$, then the sampling rate for $n$ filters would be $$f_s \geqq 2nf_6 \quad (3)$$

In order that these samples be uncorrelated, the noise source must have a bandwidth greater than one-half of $f_s$. Thus, to produce ten independent, uncorrelated random pulse series each having an average repetition rate of five pulses per second, each filter must have a bandwidth of at least ten, and preferably more, cycles per second to pass the necessary sidebands. An economical filter with such bandwidths preferably has an upper cut-off frequency on the order of 1000 to 1500 cycles per second. With such a filter the bandwidth of the noise source would have to be on the order of ten to fifteen kilocycles ($n$ times $f_6$) and the sampling rate be on the order of 20 to 30 kilocycles (twice the noise bandwidth).

If we desire a much larger number of random pulse trains, however, the sampling rate becomes undesirably large. Thus for 100 or 200 independent random pulse trains, sampling rates of 200 to 600 kilocycles are required. For practical reasons, sampling speeds of this order are to be avoided if possible. These speeds may be easily circumvented, however, by routing each series of noise samples to more than one band-pass filter. This is illustrated in Fig. 1 where noise samples are routed to three filters 61, 62 and 63. These filters are of similar bandwidth to pass noise energy of corresponding frequency spectra, but are centered on different mid-band frequencies. The advantages of this arrangement are obvious. The sampling rate is reduced by a factor of three and the bandwidth of the noise source is reduced accordingly. Large numbers of independent random pulse sources can thus be provided with a sampling commutator operated at economical speeds. The number of filters connected to each commutator segment could be easily increased to further reduce commutating speed and the bandwidth of the filters likewise increased to give a wider range of repetition rates in the pulse outputs.

It is to be understood that the above-described arrangements are merely illustrative of the many specific embodiments which can represent applications of the principles of the invention. Numerous and varied other arrangements can readily be devised by those skilled in the art without departing from the spirit or the scope of the invention.

What is claimed is:

1. A talkspurt simulator which comprises a first and a second source of random noise signals, means for sampling noise signals from each of said first and second noise sources, means for distributing noise samples from said first noise source to a first plurality of control lines, means for distributing noise samples from said second noise source to a second equal plurality of control lines, means in each of said control lines for deriving randomly-spaced pulses in response to said noise samples, a signal source, a plurality of output lines equal to said first and second plurality, gating means associated with each of said output lines, each of said gating means being adapted, when enabled, to transmit signals from said signal source to a respective one of said output lines, means for enabling each of said gates in response to a pulse on a respective one of said control lines of said first plurality and means for disabling each of said gates in response to a pulse on a respective one of said control lines of said second plurality.

2. Means for providing signals on a plurality of output leads varying randomly with respect to occurrence and duration, which signal providing means comprises means for producing randomly-spaced pulses on a plurality of output leads, a signal source, a plurality of output terminals, means responsive to pulses on each of a first group of said output leads for initiating a connection between said signal source and a respective one of said output terminals, and means responsive to pulses on each of a second group of said output leads for terminating a connection between said signal source and a respective one of said output terminals.

3. The combination according to claim 2 in which said randomly-spaced pulse producing means comprises first and second generators of noise signals, means for sampling and distributing said noise signals to a plurality of bandpass filters, means connected to each of said bandpass filters for detecting the envelope of filtered samples of said noise signals, and means responsive to the amplitude of said detected envelope for generating pulses of random occurrence.

4. The combination according to claim 2 in which said means for initiating and terminating said connections comprise a plurality of bistable devices, means for setting said bistable devices in one condition of stability in response to pulses on respective ones of said first group of output leads, means for resetting said bistable devices in the other condition of stability in response to pulses on respective ones of said second group of output leads, a plurality of normally disabled gating means, and means responsive to said one condition of stability of each of said bistable devices for enabling a respective one of said gating means.

5. Means for producing signals simulating the activity distribution characteristics of a plurality of human speakers which comprises a first and a second source of pulses of random amplitudes, means for distributing said pulses in sequence to a first and a second plurality of filtering means, means connected to each of said filtering means for detecting the envelope of the output of the connected one of said filtering means, means connected to each of said envelope detecting means for producing a pulse when and only when said detected signal exceeds a threshold amplitude, a plurality of bistable multivibrators, means for setting each of said multivibrators in response to a pulse from a respective one of said first plurality of filtering means, means for resetting each of said multivibrators in response to a pulse from a respective one of said second plurality of filtering means, a source of audible frequency signals, a plurality of gating means, a plurality of output terminals, means responsive to the outputs of said multivibrators for enabling respective ones of said gating means to connect said audible signal source to respective ones of said output terminals.

6. A multiple random pulse generator which comprises a source of noise signals, commutating means for sampling and distributing said noise signals to a plurality of commutator segment output leads in sequence, filtering means connected to each of said commutator segment output leads to produce a signal of substantially constant frequency but of random amplitude, and means responsive to the amplitude of each of said signals for producing randomly spaced pulses.

7. The multiple random pulse generator according to claim 6 in which said commutating means includes means for providing samples at a rate equal to at least twice the upper frequency limit of said source of noise signals.

8. The multiple random pulse generator according to claim 6 in which each of said filtering means comprises a plurality of bandpass filters having substantially the same bandwith and having mid-band frequencies differing by at least said bandwidth.

9. The multiple random pulse generator according to claim 6 in which said means for producing randomly spaced pulses comprises means for detecting the amplitude of the envelope of said signal of substantially constant frequency and pulse producing means responsive to amplitudes of said envelope exceeding a threshold value for generating pulses of fixed duration and random spacing.

10. Means for producing randomly spaced pulses on each of a plurality of output leads which comprises a noise source, means for sampling signals from said noise source, a plurality of frequency limiting devices, means for distributing said noise samples to said plurality of frequency limiting devices in sequence, separate means for detecting the envelope of the output of each of said frequency limiting devices, separate means responsive to the amplitude of each of said envelopes for generating pulses, a plurality of output means, and means for introducing pulses from each of said pulse generating means to respective ones of said output means.

11. Means for producing randomly spaced pulses according to claim 10 in which the threshold of response of each of said pulse producing means is adjustable, and common control means for adjusting the thresholds of response of all of said pulse producing means together.

12. A signal generator which comprises first and second random pulse generating means, each of said random pulse generating means including a source of random signals, means for sampling and distributing random signals from said suorce to a plurality of filtering means in sequence, means for detecting the instantaneous amplitude of the envelope of the output of each of said filtering means, a plurality of control leads, and means for producing pulses on each one of said control leads in response to the instantaneous amplitude of said envelope from a respective one of said detecting means, said signal generator further comprising a plurality of bistable devices, means for setting each one of said bistable devices in one condition of stability in response to pulses on a respective one of said plurality of control leads from said first pulse generating means, and means for setting each one of said bistable devices in the other condition of stability in response to pulses on a respective one of said plurality of control leads from said second pulse generating means.

References Cited in the file of this patent

UNITED STATES PATENTS

| | | |
|---|---|---|
| 2,098,956 | Dudley | Nov. 16, 1937 |
| 2,411,648 | Brauer | Nov. 26, 1946 |
| 2,672,512 | Mathes | Mar. 16, 1954 |

FOREIGN PATENTS

| | | |
|---|---|---|
| 781,622 | Great Britain | Aug. 21, 1957 |